United States Patent
Avudaiyappan (10) Patent No.: US 10,565,113 B2
(45) Date of Patent: Feb. 18, 2020

(54) METHODS AND SYSTEMS FOR MANAGING SYNONYMS IN VIRTUALLY INDEXED PHYSICALLY TAGGED CACHES

(71) Applicant: Intel Corporation, Santa Clara, CA (US)

(72) Inventor: Karthikeyan Avudaiyappan, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 184 days.

(21) Appl. No.: 14/825,502

(22) Filed: Aug. 13, 2015

(65) Prior Publication Data

US 2016/0224471 A1    Aug. 4, 2016

Related U.S. Application Data (63) Continuation of application No. PCT/US2011/056757, filed on Oct. 18, 2011.

(51) Int. Cl.
*G06F 12/0831* (2016.01)
*G06F 12/1045* (2016.01)
(Continued)

(52) U.S. Cl.
CPC ...... *G06F 12/0833* (2013.01); *G06F 12/0811* (2013.01); *G06F 12/0822* (2013.01);
(Continued)

(58) Field of Classification Search
CPC ............. G06F 12/0833; G06F 12/1063; G06F 12/0822; G06F 12/0811; G06F 12/0855;
(Continued)

(56) References Cited

U.S. PATENT DOCUMENTS 5,206,941 A * 4/1993 Eikill .................. G06F 12/0855
  711/121
5,526,510 A * 6/1996 Akkary ............... G06F 12/0831
  710/57

(Continued)

FOREIGN PATENT DOCUMENTS

CN          1124378       6/1996
TW          200422832     11/2004

OTHER PUBLICATIONS

International Preliminary Report on Patentability for Application No. PCT/US2011/056757, dated May 1, 2014, 6 pages.

(Continued)

*Primary Examiner* — Michael Krofcheck
(74) *Attorney, Agent, or Firm* — Nicholson De Vos Webster & Elliot, LLP (57) ABSTRACT

Methods and systems for managing synonyms in VIPT caches are disclosed. A method includes tracking lines of a copied cache using a directory, examining a specified bit of a virtual address that is associated with a load request and determining its status and making an entry in one of a plurality of parts of the directory based on the status of the specified bit of the virtual address that is examined. The method further includes updating one of, and invalidating the other of, a cache line that is associated with the virtual address that is stored in a first index of the copied cache, and a cache line that is associated with a synonym of the virtual address that is stored at a second index of the copied cache, upon receiving a request to update a physical address associated with the virtual address.

17 Claims, 9 Drawing Sheets

(51) Int. Cl.
  *G06F 12/0811* (2016.01)
  *G06F 12/0817* (2016.01)
  *G06F 12/0855* (2016.01)

(52) U.S. Cl.
  CPC ...... *G06F 12/0855* (2013.01); *G06F 12/1054* (2013.01); *G06F 12/1063* (2013.01); *G06F 2212/283* (2013.01); *G06F 2212/621* (2013.01)

(58) Field of Classification Search
  CPC .......... G06F 12/1054; G06F 2212/621; G06F 2212/283
  See application file for complete search history.

(56) References Cited

U.S. PATENT DOCUMENTS

| | | | |
|---|---|---|---|
| 5,930,833 A | 7/1999 | Yoshioka et al. | |
| 5,996,048 A * | 11/1999 | Cherabuddi | G06F 12/0811 711/119 |
| 6,438,658 B1 * | 8/2002 | Baliga | G06F 12/0891 711/118 |
| 6,591,340 B2 | 7/2003 | Chopra et al. | |
| 6,625,714 B1 * | 9/2003 | Lyon | G06F 12/1054 711/168 |
| 7,330,961 B2 | 2/2008 | Sakata et al. | |
| 2002/0129208 A1 * | 9/2002 | Barroso | G06F 12/0826 711/141 |
| 2003/0023814 A1 * | 1/2003 | Barroso | G06F 12/0826 711/122 |
| 2007/0250666 A1 * | 10/2007 | Sartorius | G06F 12/0891 711/133 |
| 2008/0313405 A1 * | 12/2008 | Sakata | G06F 12/0811 711/122 |
| 2009/0216949 A1 * | 8/2009 | Krumm | G06F 12/0811 711/122 |
| 2014/0122810 A1 * | 5/2014 | Bhoria | G06F 12/0811 711/144 |
| 2015/0032964 A1 * | 1/2015 | Habermann | G06F 12/0811 711/122 |

OTHER PUBLICATIONS

International Search Report and Written Opinion for Application No. PCT/US2011/056757, dated May 23, 2012, 7 pages.

* cited by examiner

METHODS AND SYSTEMS FOR MANAGING SYNONYMS IN VIRTUALLY INDEXED PHYSICALLY TAGGED CACHES

CROSS-REFERENCE TO RELATED APPLICATIONS

This application is a continuation of International Application No. PCT/US2011/056757, filed Oct. 18, 2011, which is hereby incorporated by reference.

BACKGROUND

A cache in a central processing unit is a data storage structure that is used by the central processing unit of a computer to reduce the average time that it takes to access memory. It is a memory which stores copies of data that is located in the most frequently used main memory locations. Moreover, cache memory is memory that is smaller and that may be accessed more quickly than main memory. There are several different types of caches. These include physically indexed physically tagged (PIPT), virtually indexed virtually tagged (VIVT) and virtually indexed physically tagged (VIPT).

Figure 1:
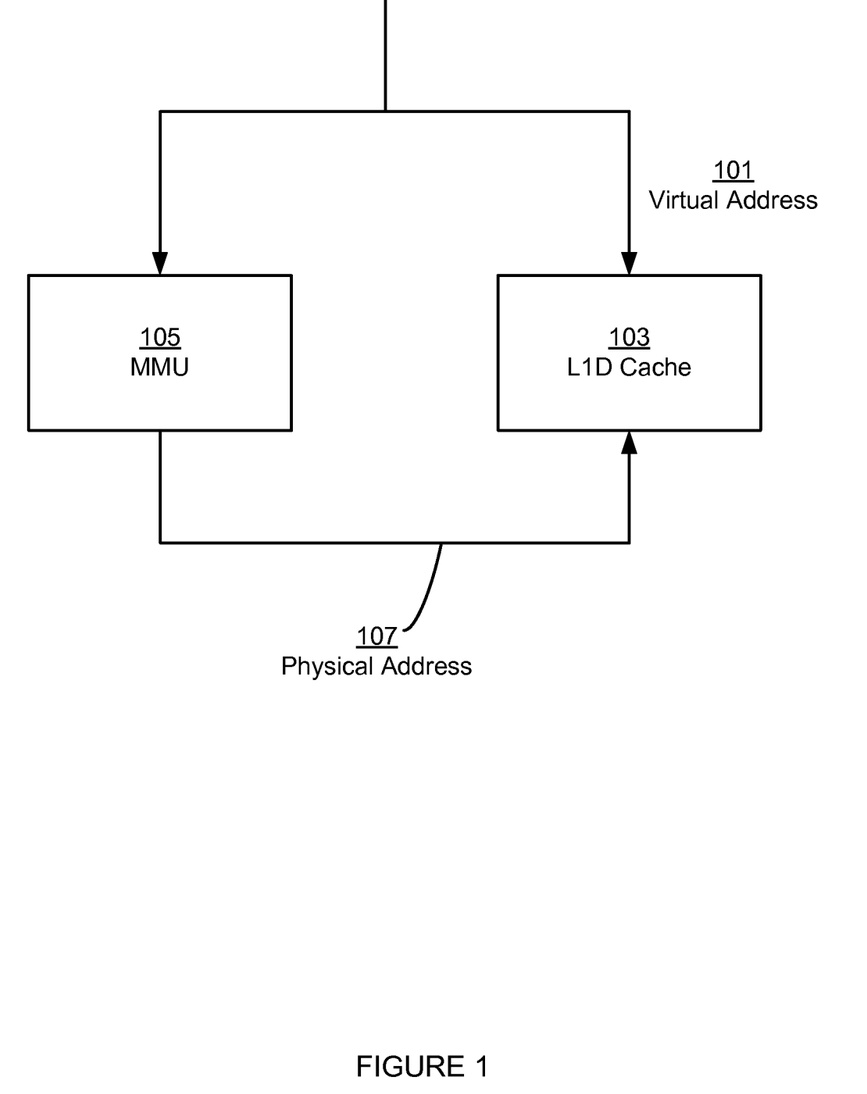
FIG. 1 shows components of a conventional system for accessing a virtually indexed physically tagged (VIPT) cache.

VIPT caches are commonly used in modern processing applications. These caches use a virtual address (VA) for the index (which identifies a unique location in cache memory) and a physical address in the tag (which contains the main memory index of the datum that has been cached) that are associated with cache lines. Using this type of cache, a cache line can be identified in parallel with translation lookaside buffer (TLB) translation as is illustrated in FIG. 1. Referring to FIG. 1, a VIPT cache starts a tag read using virtual address bits 101 (e.g., un-translated virtual address bits) to index into the cache 103, while Memory Management Unit (MMU) 105 translates some of the higher order bits of the virtual address, to physical address bits 107. Physical address bits 107 are thereafter compared with the tag value of the VIPT cache that is associated with the cache line. Thus, VIPT caches are able to hide their access time, by overlapping their tag read process with the MMU translation process.

Consider a 64 KB, 8 way associative level 1 VIPT cache. Moreover, assume a minimum MMU page size of 4 KB, 32$b$ long virtual address (VA) and 40$b$ long physical address (PA). Based on the processes described above, the VIPT cache uses VA[12:6] (bits [12:6] of the virtual address) to index into a Tag SRAM (not shown) to generate TagPA[39:12] (the physical address associated with the un-translated virtual address presented to the Tag SRAM) from all 8 ways. While the VIPT cache is busy accessing it's Tag SRAM, the MMU translates VA[31:12] (bit twelve) to produce MMU PA[39:12] (the physical address that is generated from the translation). MMU PA[39:12] is compared against TagPA[39:12] to generate TagHit[7:0] which identifies the way among the 8 ways of the VIPT cache that has the cache line. Above, VA[12] is used to index into the Tag SRAM, while VA[12] goes through translation to generate a PA[12]. Indexing the cache with a virtual address bit that also gets translated into a physical address, can result in synonyms. Consider the following result:

VA0[31:13]=0x0, VA0[12]=0x0, VA0[11:0]=0x0→(Translation)→PA[39:0]=0x0

VA1 [31:13]=0x1, VA1[12]=0x1, VA1[11:0]=0x0→(Translation)→PA[39:0]=0x0

Above, VA0 and VA1, that differ in their 12th bit, when translated by the MMU, produce the same PA[39:0]. When VA0 accesses the VIPT cache using VA[12:6] (VA[12:6]=0000000), it accesses index 0 of the Tag SRAM (not shown). Moreover, when VA1 accesses the VIPT cache using VA[12:6] (VA[12:6]=0000001), it accesses index 64 of the Tag SRAM. Thus, the same physical address is associated with VA1 and VA2 and resides in both index 0 and index 64 of the VIPT cache. The two virtual addresses, VA1 and VA2 that map to the same physical address of main memory are referred to as "synonyms". The same physical address being associated with two (or more) entries in the VIPT cache is known as "aliasing."

Aliasing arises when a size of "a way" of a VIPT cache exceeds the smallest memory page size. Unaddressed, aliasing can result in data inconsistencies. A conventional method of addressing aliasing, when a level 1 or L1 cache is included in a level 2 or L2 cache (a copy of the entire contents of the L1 cache is maintained in the L2 cache), is to store synonym-VA bits (in the above example VA[12]) in L2 cache's tag. A drawback of this method is that a storage bit (e.g., VA[12]) is required for every L2 tag index and an additional bit is required to identify each synonym. Thus, the conventional methodology is deficient as it causes a two dimensional growth in storage in the L2 cache that corresponds to increases in the size of the L2 cache and in the number of synonyms that are contained therein. In addition, in conventional systems, when data associated with a physical address that is mapped to virtual address synonyms is updated, only one location in cache may be updated. In order to avoid data inconsistencies that can result from such incomplete updates, many conventional systems execute a time consuming search of the contents of the cache to ensure the invalidation of all virtual address synonyms that are related to the physical address that is updated. Accordingly, because of their burdensome data storage and cache searching operations, conventional approaches to managing synonyms have significant shortcomings.

SUMMARY

Many conventional approaches to handling synonyms in VIPT caches feature burdensome data storage and cache searching operations. A directory based methodology that addresses such shortcomings by using a directory that is divided into separate parts is disclosed. However, the claimed embodiments are not limited to implementations that address any or all of the aforementioned shortcomings. As a part of the disclosed methodology, cache lines of a copied cache are tracked using a directory, a specified bit of a virtual address is examined that is associated with a load request and its status determined, and, an entry is made in one of a plurality of parts of the directory based on the status of the specified bit of the virtual address that is examined Upon receiving a request to update a physical address associated with the virtual address, one of a cache line that is associated with the virtual address that is stored in a first index of the copied cache, and a cache line that is associated with a synonym of the virtual address that is stored at a second index of the copied cache, is invalidated. Because a single directory is involved, the updating and invalidating of cache lines, corresponding to synonyms, that are stored in the copied cache and that are associated with directory entries, can be efficiently executed in a single clock cycle without a time consuming search of the cache.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "tracking" or "examining" or "making" or "updating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 2A:
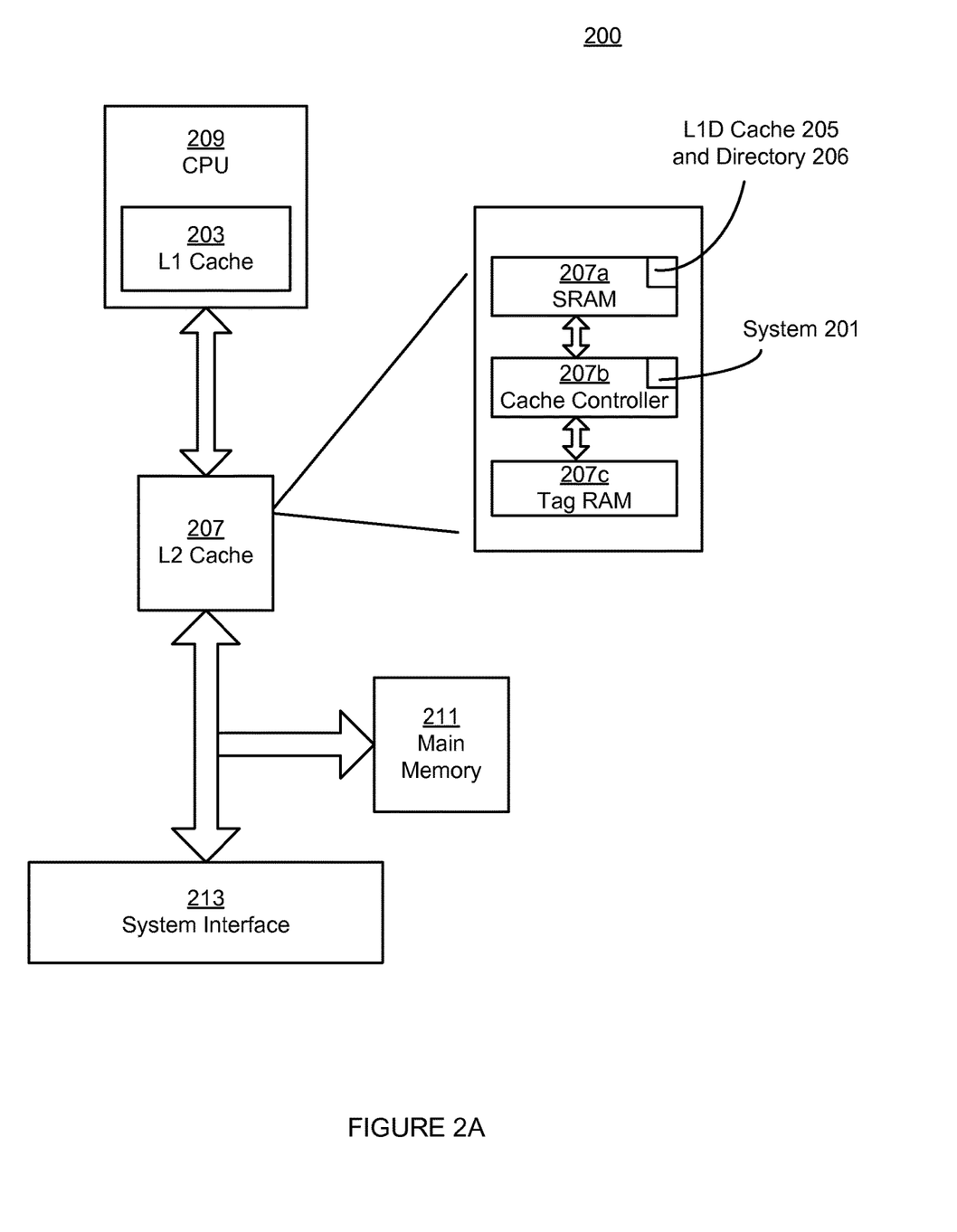
FIG. 2A shows an exemplary operating environment of a system for managing synonyms in VIPT caches according to one embodiment.

Exemplary Operating Environment of System for Managing Synonyms in Virtually Indexed Physically Tagged Caches According to One Embodiment FIG. 2A shows an exemplary operating environment 200 of a system 201 for managing synonyms in virtually indexed physically tagged (VIPT) caches according to one embodiment. System 201 enables the respective updating and invalidating of respective cache line entries associated with a physical address, and corresponding to synonyms, in a single clock cycle. FIG. 2A shows system 201, L1 cache 203, copied cache 205 (and directory 206), L2 cache 207, CPU 209, main memory 211 and system interface 213.

Referring to FIG. 2A, system 201 manages synonym growth in cache memory by efficiently updating and invalidating cache line entries that correspond to synonyms that correspond to a physical address that is associated with an update request. In one embodiment, system 201, supported by directory 206, is able to directly identify synonyms, which correspond to a physical address associated with the update request, without an exhaustive and time consuming search of cache contents. In one embodiment, system 201 can be located in L2 cache 207, such as in L2 cache controller 207b. In other embodiments, system 201 can be separate from components of the L2 cache, such as L2 cache controller 207b, but operate cooperatively therewith. In exemplary embodiments, system 201 directs the efficient invalidation of one or more cache line entries that correspond to synonyms by directing their invalidation in the same clock cycle in which a cache line entry associated with a counterpart synonym that is selected for updating is updated. In one embodiment, this is facilitated by the configuration of directory 206 which tracks the contents of a copy of the L1 cache 203 (copied cache 205) that is maintained by L2 cache 207. In one embodiment, as shown in FIG. 1, L1 cache 203 is located in CPU 209 and directory 206 is located in L2 cache 207.

Figure 2B:
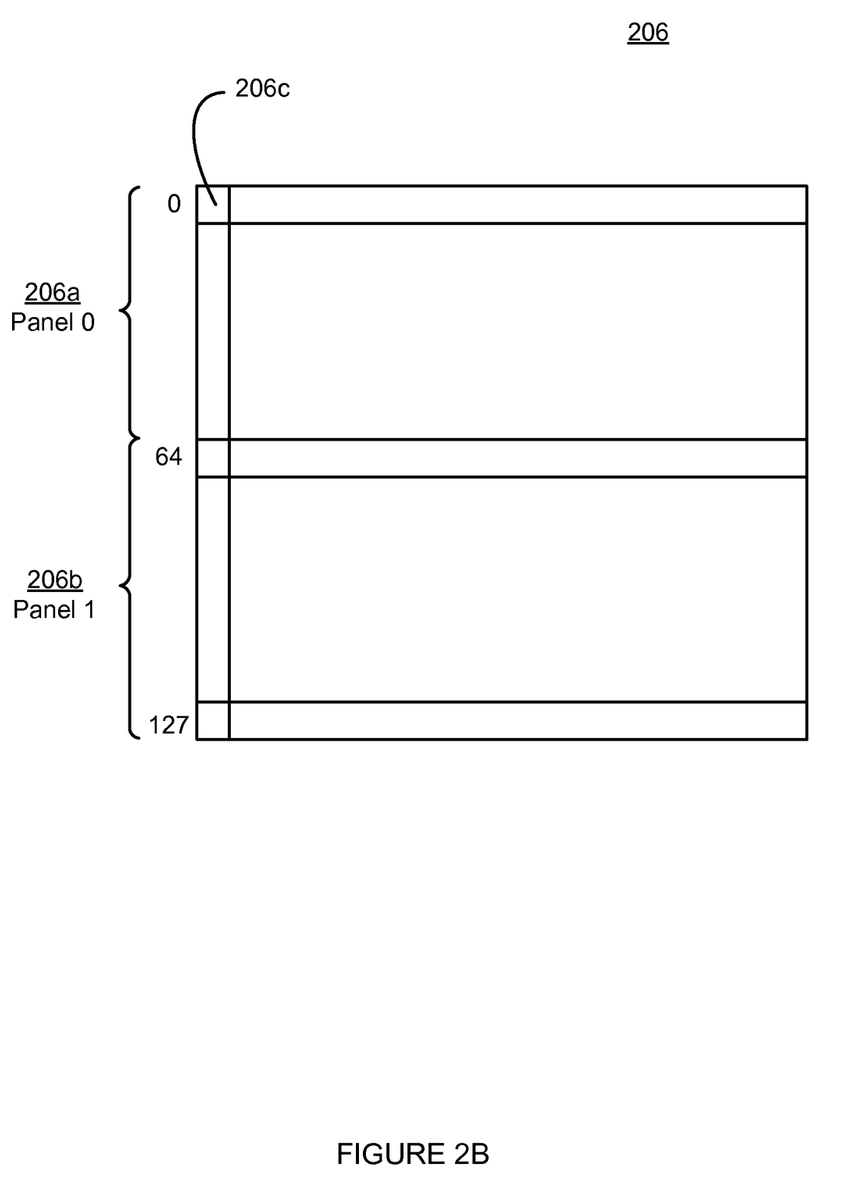
FIG. 2B shows a directory that is divided into a first panel and a second panel based on the synonym virtual address (VA) bit that is associated with access requests according to one embodiment.

Directory 206 is configured to maintain entries for each of the cache lines stored in copied cache 205 (e.g., copied L1 data and/or instruction caches). The entries are maintained in a manner that facilitates the direct identification of synonyms, associated with the cache lines that correspond to the physical address that is associated with an update request. To this end, as is shown in FIG. 2B, directory 206 is divided into first panel 0 206a and second panel 1 206b based on a "synonym VA" bit that is associated with requests for access. Referring to FIG. 2B, the respective panels, 206a and 206b, correspond to respective virtual address ranges. In one embodiment, synonym VA bits identify the virtual address range to which the virtual address of a synonym belongs. Accordingly, the synonym VA bits determine the panel of directory 206 where directory entries that correspond to the cache lines stored in copied cache 205 are maintained. Because both panels are a part of the same directory, the updating and invalidating of cache lines stored in copied cache 205 that are associated with directory 206 entries can be executed in a single clock cycle without an exhaustive and time consuming search of the cache.

In the FIG. 2B embodiment, directory 206 is configured to include 128 lines (shown as 0-127 in FIG. 2B) that track the lines that are stored in copied cache 205. In this embodiment lines 0-63 are included in panel 0 206a and correspond to a first range of virtual addresses VA[12]=0 and lines 64-127 are included in panel 1 206b and correspond to a second range of virtual addresses VA[12]=1. Moreover, each line includes a place 206c where the validity or non-validity of the line can be indicated (such as with a bit).

Referring again to FIG. 2A, in one embodiment, load requests to L2 cache 207 involving a synonym are received via the L2 cache 207 pipeline (the pipeline of request that are received by L2 cache 207 such as where there has been an L1 cache 203 miss for the request). Subsequently, when the load request is executed, and the cache line involved in the load request is stored in copied cache 205, the synonym VA bit (or bits) associated with the request is used to update the appropriate directory panel to indicate that the cache line has been stored in copied cache 205. For example, in one embodiment, if a load request regarding a physical address (PA) is received at L2 cache 207 with VA=VA0=0, panel 0 206a is updated (see FIG. 2B). However, if a load request regarding that physical address (PA) is received at L2 cache 207 with a VA=VA1=1, panel 1 206b is updated (see FIG. 2B).

It should be appreciated that after the operations described above have been executed, because VA0 and VA1 are synonyms, both VA0 and VA1 are then associated with the same physical address (PA). Moreover, the data associated with this physical address (PA) then resides in copied cache 205 at two different indices, both 0 and 64. Subsequently, when an update request (e.g., store) is received via the L2 cache pipeline, to update that physical address (PA), system 201 randomly chooses one of the two cache line entries associated with that physical address (PA) for update and the other for invalidation. Thus, in one embodiment, a cache line associated with the physical address (PA) that is associated with VA0 and VA1 is allowed to reside at two different indexes in copied cache 205, until there is a store request that involves updating that particular physical address (PA). As such, performance benefits that are obtained from maintaining both copies of the cache line in copied cache 205 are realized.

L1 cache 203 is a level 1 cache and L2 cache 207 is a level 2 cache. In one embodiment, L2 cache 207 is much larger in size than L1 cache 203. In one embodiment, when there is a level 1 cache miss, the request is provided to level 2 cache L2, which examines directory 206 to determine if the requested information resides in copied cache 205.

Main memory 211 includes physical addresses that store the information that is copied into cache memory. When the information that is contained in the physical addresses of main memory that have been cached is changed, the corresponding cached information is updated to reflect the changes made to the information stored in main memory. Accordingly, as discussed above, this can involve system 201 randomly choosing one cache line entry associated with the physical address that is associated with the update request to update and other cache line entries associated with the physical address to invalidate. Other structures shown in FIG. 2A include system interface 211, tag RAM 207c and L2 cache SRAM 207a.

Figure 2C:
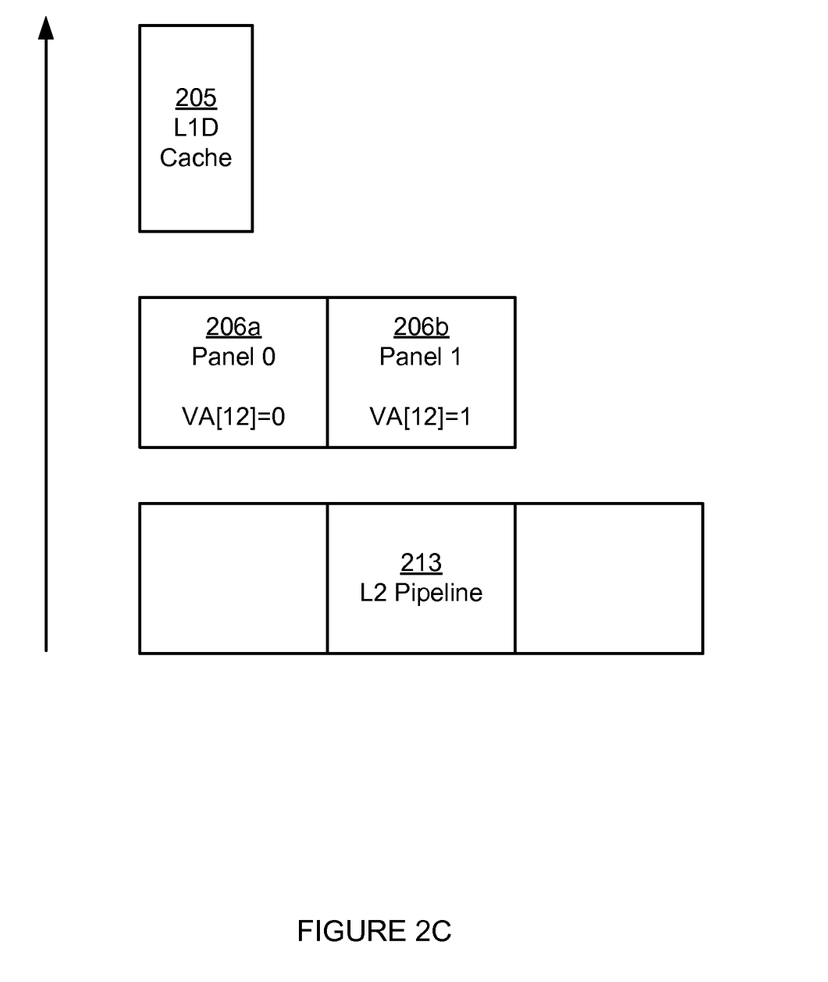
FIG. 2C shows a diagram of the relationship between selected cache system blocks according to one embodiment.

FIG. 2C shows a diagram of the relationship between selected cache system blocks according to one embodiment. Referring to FIG. 2C, a request received via L2 pipeline 213 to update a cache line in copied cache 205 corresponding to a synonym that is associated with a physical address, prompts a review of directory 206. The review of directory 206 identifies the cache line entries stored in copied cache 205 that are associated with the physical address. As discussed above, system 201 then randomly selects one of the cache line entries for update and the other for invalidation. Accordingly, only a single cache line corresponding to the physical address is left in copied cache 205 after an update request related to that physical address. Moreover, immediately after the aforementioned update and invalidation operations no synonyms are associated with the physical address in copied cache 205.

Operation

Figure 2D:
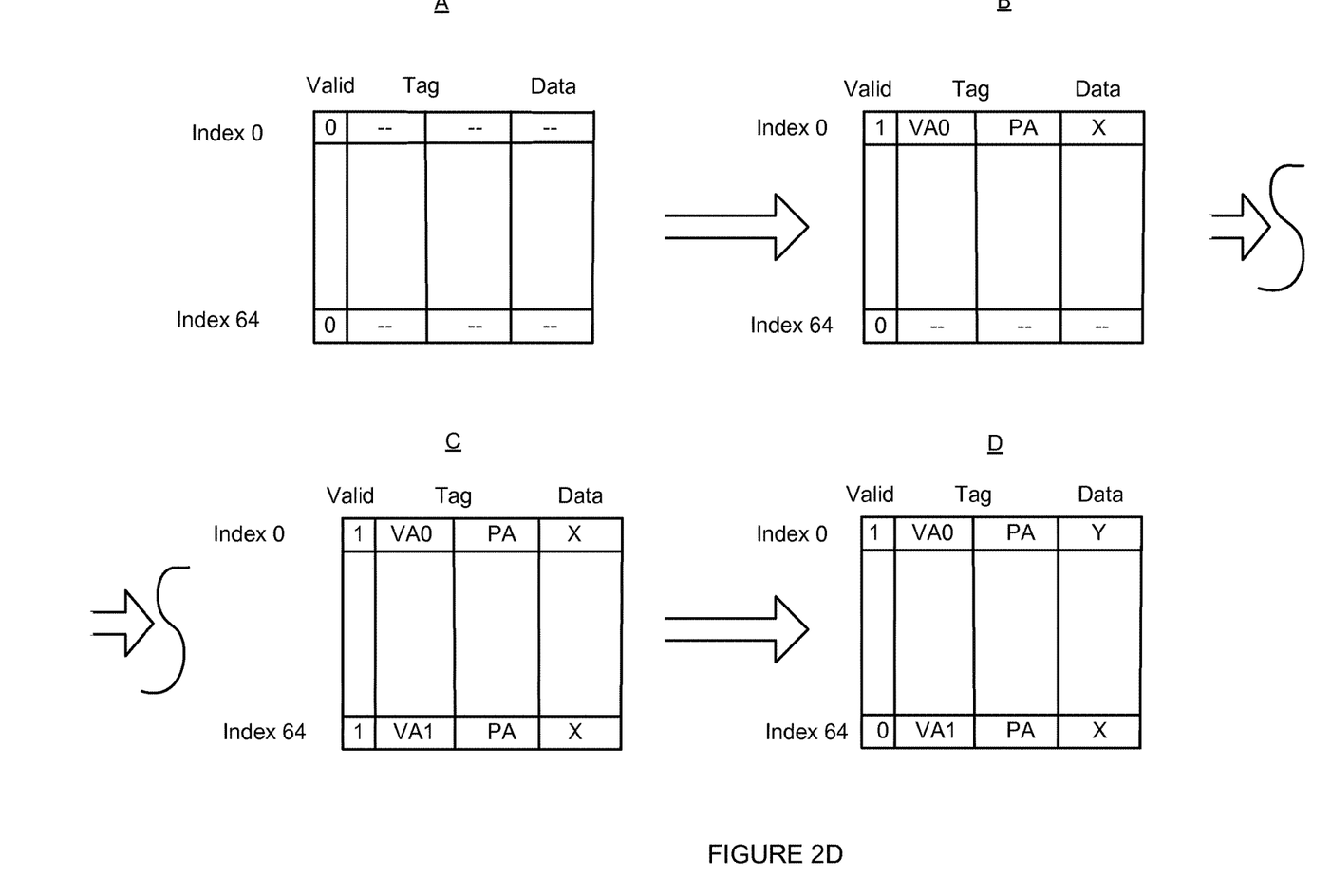
FIG. 2D illustrates aspects of the operation of a system for managing synonyms in a VIPT cache according to one embodiment.
Figure 2E:
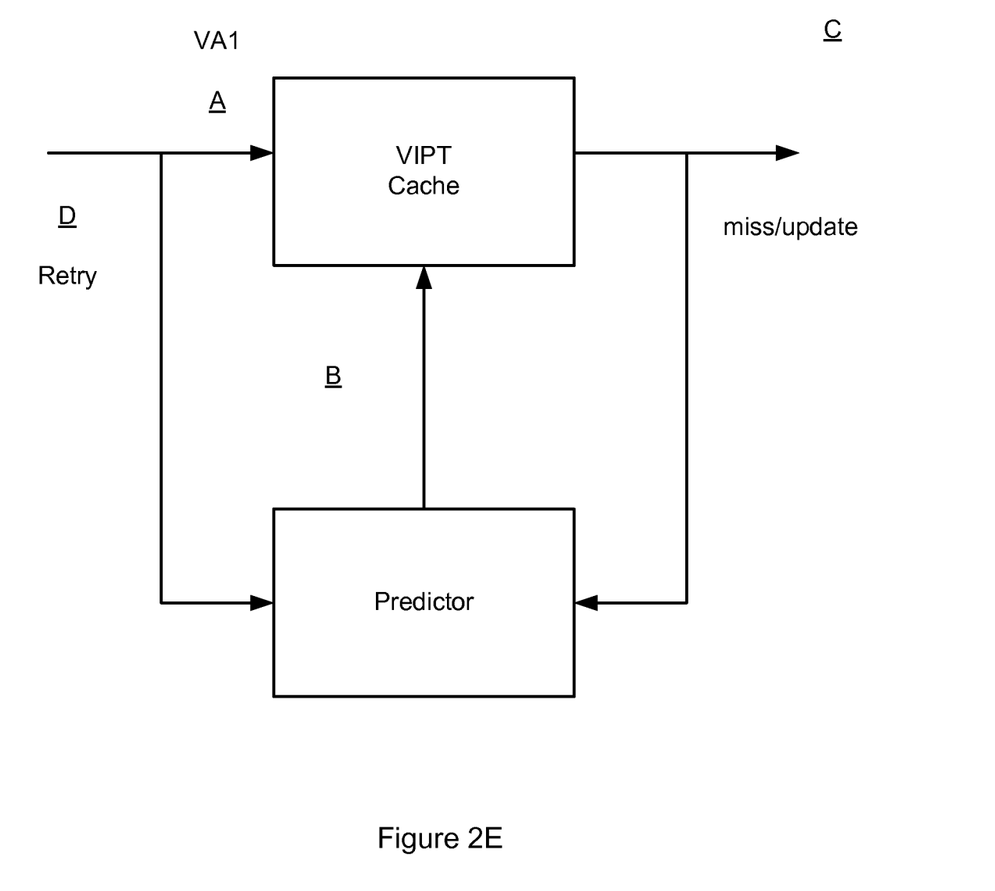
FIG. 2E illustrates aspects of the operation of a system for managing synonyms in a VIPT cache according to one embodiment.

FIGS. 2D and 2E illustrate aspects of the operation of system 201 for managing synonyms in VIPT according to one embodiment. These operations, which relate to managing synonyms, are illustrated for purposes of clarity and brevity. It should be appreciated that other operations not illustrated by FIGS. 2D and 2E can be performed in accordance with one embodiment. In FIG. 2D, operations are illustrated by reference to schematics that correspond to a series of states of copied cache 205 of L2 cache 207 (see FIG. 2A).

Implicit Based Handling of Synonyms

Referring to FIG. 2D, at A, index 0 and index 64 of copied cache 205 are indicated to be invalid. This is a condition that could occur, for example, after a reset.

At B, based on a data store request, a cache line entry is stored in copied cache 205 at index 0. In one embodiment, the cache line entry includes a valid bit, a tag (e.g., a virtual address and physical address) and a data block.

At C, the cache line stored at index 0 is loaded into index 64. In one embodiment, this can occur when a subsequent request to store data associated with the physical address associated with the cache line stored at index 0 involves a synonym of the virtual address that is associated with the cache line stored at index 0. The result is that this physical address is associated with cache lines stored at both index 0 and index 64.

At D, the cache line entry at index 0 is updated with a new data value and the cache line entry at index 64 is invalidated. In one embodiment, when one of the entries is chosen to be updated the other is invalidated. As described herein, when a request is made to update one of the entries, a random choice is made regarding which of the two entries is to be updated and which is to be invalidated.

In one embodiment, the above described implicit based handling of synonyms addresses the aliasing problem in copied cache 205 (FIG. 2A) using a directory structure that is used to ensure that copied cache 205 is included in L2 cache 207. This is illustrated in FIG. 2D. This solution allows the copied cache 205 (FIG. 2A) to have the same physical address associated with two entries in copied cache 205 (FIG. 2A) as long as there is no need to update that physical address with a new value. When the time comes to update the physical address with a new value, the cache line entry associated with the physical address at one index is invalidated (which is randomly chosen between the two possible entries in copied cache 205).

Predictor Based Handling of Synonyms

FIG. 2E illustrates operations executed as a part of predictor based handling of synonyms according to one embodiment. Consider two virtual addresses VA0 and VA1 from separate processes that meet the following conditions: VA0 [12:6] and VA1 [12:6] are equal and PA0 [12] and PA1 [12] are not equal. Moreover, when translated, VA1 [12] is not equal to PA1 [12]. If the cache involved was physically indexed and physically tagged (PIPT), or was 32 KB featuring 8 way associativity, the two physical addresses would be stored at indexes 0 and 64 respectively. However, if the cache is accessed using virtual addresses (is a VIPT cache) that have the same synonym VA (e.g., 12:6), the two physical addresses end up at the same index, e.g., index 0, where they occupy two different ways, which is not desirable for optimum performance. The operations illustrated in FIG. 2E address this problem.

Referring to FIG. 2E, at A, a VIPT cache is accessed using a virtual address VA1 that has a bit VA1 [12:6] that has the same value as a bit VA0 [12:6] of a virtual address VA0 that has previously accessed the cache.

At B, the physical address bit PA [12] of the physical address that is associated with a virtual address VA1 is predicted. In one embodiment, the prediction can be random. In other embodiments, the prediction can be non-random. For example, in one embodiment, the system (e.g., system 201 in FIG. 2A) can randomly select between logical values 0 and 1 for PA [12] when the cache is accessed.

At C, if the prediction is determined to be incorrect (e.g., the predicted PA [12] is not the same as the actual PA [12]) a miss is indicated and the system (e.g., 201 in FIG. 2A) is updated to include the correct value of PA [12] such that the system prospectively predicts correctly based on the updated information.

At D, the request is retried using the correct value for PA [12].

In one embodiment, predictor based handling of synonyms serve to ensure that if a cache is accessed using VA [12], the two virtual addresses VA0 and VA1, having characteristics as described above, do not end up at the same index.

Figure 3:
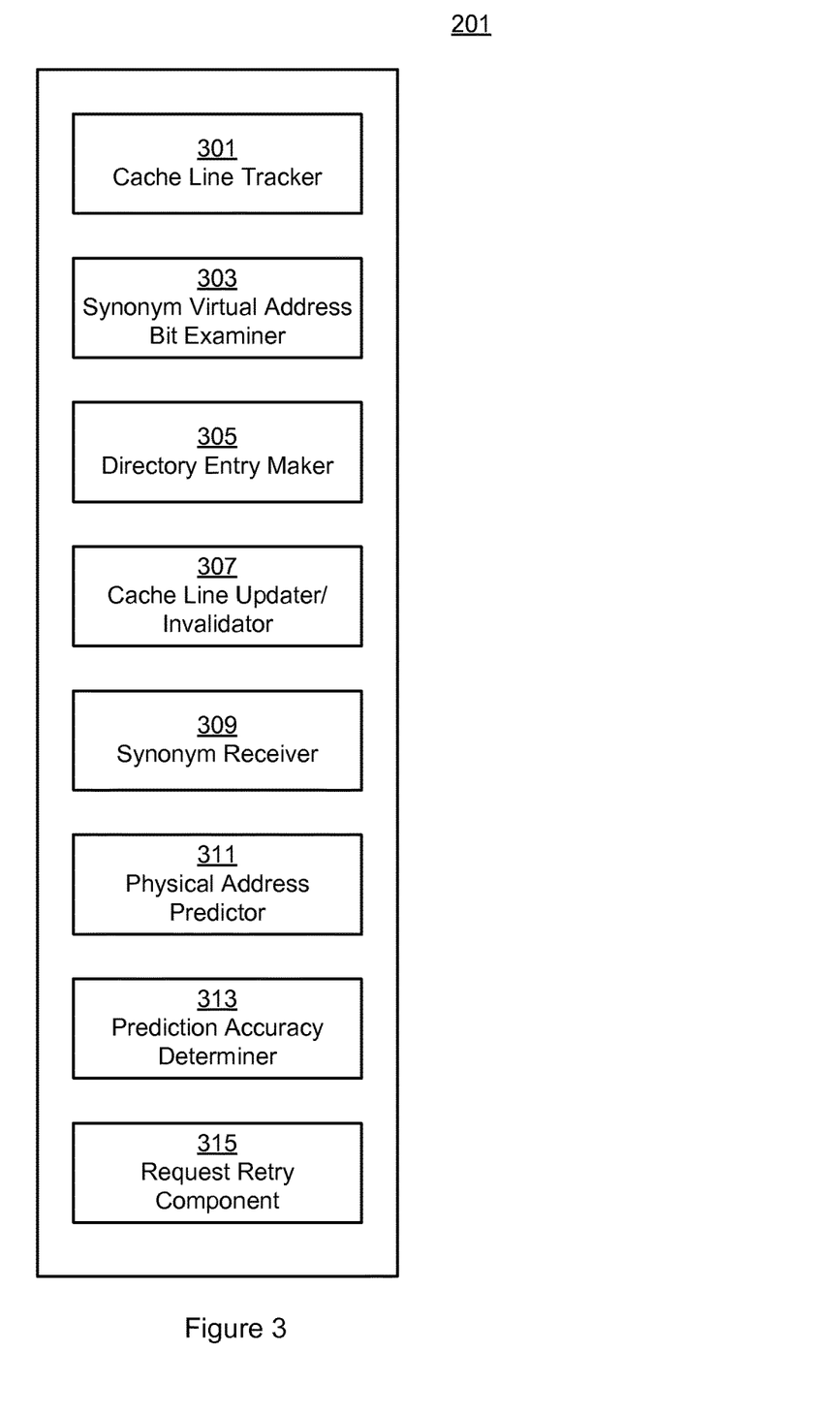
FIG. 3 shows components of a system for managing synonyms in VIPT caches according to one embodiment.

Components of System for Managing Synonyms in Virtually Indexed Physically Tagged Caches According to One Embodiment FIG. 3 shows components of a system 201 (see also FIG. 2A) for managing synonyms in VIPT caches according to one embodiment. In one embodiment, components of system 201 implement an algorithm for managing synonyms in virtually indexed physically tagged (VIPT) caches. In the FIG. 3 embodiment, components of system 201 include cache line tracker 301, synonym VA bit examiner 303, directory entry maker 305, cache line updater/invalidator 307, virtual address receiver 309, physical address predictor 311, prediction accuracy determiner 313 and request retry component 315.

Implicit Synonym Handling Components

Referring to FIG. 3A, cache line tracker 301 tracks lines in a copy of a level 1 cache that is maintained in a level 2 cache. In one embodiment, cache line tracker 301 is a directory that is configured to maintain entries for each of the cache lines stored in the copy of the level 1 cache in a manner that facilitates the efficient updating and invalidating of cache line entries that correspond to synonyms that correspond to a physical address that is associated with an update request. In one embodiment, the directory is divided into first and second panels that correspond to a synonym VA bit that is associated with requests.

Synonym VA bit examiner 303 examines a synonym VA bit of a virtual address that is associated with a load request and determines its status.

Directory entry maker 305 makes an entry in one of a plurality of parts of a directory based on the status of the synonym VA bit of the virtual address that is examined. In one embodiment, the directory entry corresponds to the storage of a cache line that has an associated physical address, at an index in the copied L1 cache.

Cache line updater/invalidator 307 updates one of, and invalidates the other of, a cache line that is stored in a first index of the aforementioned copied cache, that is associated with a first virtual address, and a cache line that is stored at a second index of the copied cache, that is associated with a second virtual address (which is a synonym of the first virtual address), upon receiving an update request to update a physical address that is associated with both virtual addresses. In one embodiment, the cache line that is selected for updating and the cache line that is selected for invalidation are selected randomly.

Predictor Synonym Handling Components

Virtual address receiver 309 receives a virtual address as a part of an access request to a VIPT that has a synonym VA bit value that is the same as that of a virtual address that has previously accessed the VIPT cache. In one embodiment, the first and second virtual addresses are associated, respectively, with first and second processes.

Physical address bit predictor 311 predicts a physical address bit of a physical address that is associated with the received virtual address that is a part of the VIPT cache access request. In one embodiment, as discussed above, the prediction can be random. In other embodiments, the prediction can be non-random. For example, in one embodiment, as discussed above, the system (e.g., system 201 in FIG. 2A) can randomly select between logical values 0 and 1 for PA [12] when the cache is accessed.

Prediction accuracy determiner 313 determines if the prediction made by physical address predictor 311 is correct.

Request retry component 315 prompts the retrying of the request using the correct value for the physical address bit.

For example, if the incorrect prediction was a logical "0", then the request is retried using a logical "1".

It should be appreciated that the aforementioned components of system 201 can be implemented in hardware or software or in a combination of both. In one embodiment, components and operations of system 201 can be encompassed by components and operations of one or more computer components or programs (e.g., cache controller 207b in FIG. 2A). In another embodiment, components and operations of system 201 can be separate from the aforementioned one or more computer components or programs but can operate cooperatively with components and operations thereof.

Figure 4:
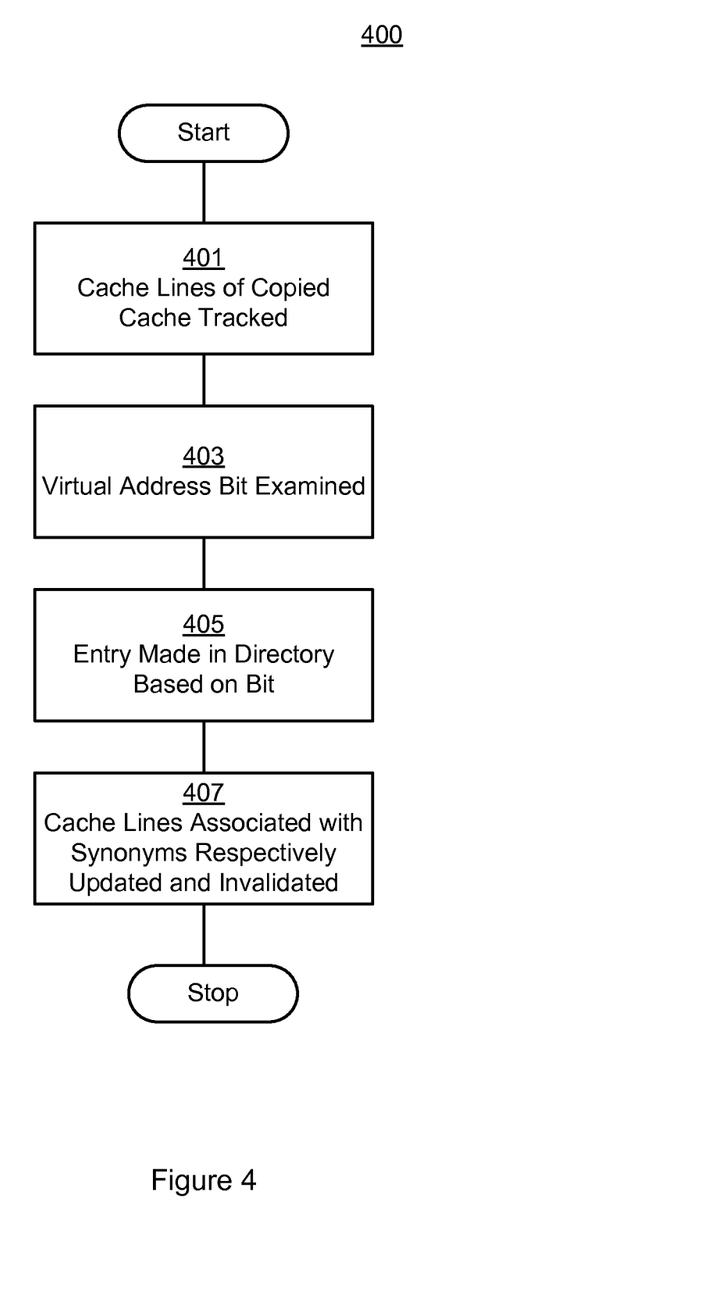
FIG. 4 shows a flowchart of the steps performed in a method for managing synonyms in VIPT caches according to one embodiment.
Figure 5:
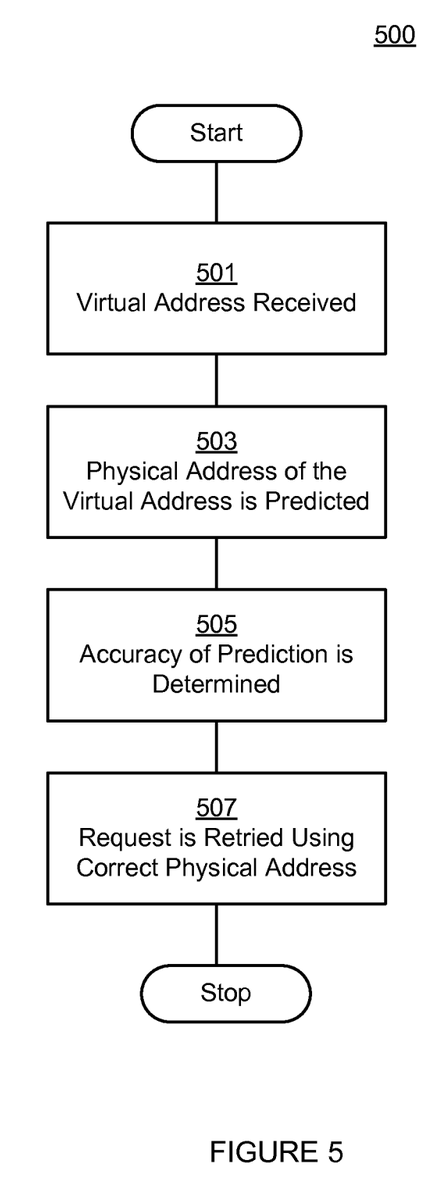
FIG. 5 shows a flowchart of the steps performed in a method for managing synonyms in VIPT caches according to one embodiment.

Process for Managing Synonyms in Virtually Indexed Physically Tagged Caches According to One Embodiment FIGS. 4 and 5 show flowcharts 400 and 500 of the steps performed in a method for managing synonyms in virtually indexed physically tagged (VIPT) caches according to one embodiment. The flowcharts include processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart. Although specific steps are disclosed in the flowcharts, such steps are exemplary. That is the present embodiments are well suited to performing various other steps or variations of the steps recited in the flowcharts.
Implicit Synonym Managing Methodology Referring to FIG. 4, at 401 cache lines in a copy of a level 1 cache that is maintained in a level 2 cache are tracked. In one embodiment, the lines are tracked in a directory that is configured to maintain entries for each of the cache lines stored in the copy of the level 1 cache in a manner that facilitates the efficient updating and invalidating of cache line entries that correspond to synonyms that correspond to a physical address that is associated with an update request. In one embodiment, the directory is divided into first and second panels as is described hereinabove.

At 403, a specified bit of the virtual address that is associated with a load request is examined and its status determined.

At 405, an entry is made in one of a plurality of parts of a directory based on the status of the specified bit of the virtual address that is examined. In one embodiment, the directory entry corresponds to the storage of a line at an index in the copied L1 cache.

At 407, one of, and the other of, a cache line entry that is associated with a virtual address that is stored in a first index of the aforementioned copied cache, and a cache line entry that is associated with its synonym that is stored at a second index of the copied cache, are respectively, updated and invalidated, upon receiving an update request to update the physical address associated with the virtual address.
Predictor Synonym Managing Methodology Referring to FIG. 5, at 501 a virtual address is received as a part of an access request to a VIPT that has a synonym VA bit value (e.g., VA [12]) that is the same as that of a virtual address that has previously accessed the VIPT cache. In one embodiment, the aforementioned addresses are associated, respectively, with first and second processes. At 503 a physical address bit (e.g., PA [12]) of a physical address that is associated with the virtual address that is a part of the VIPT cache access request is predicted. At 505, it is determined if the prediction is correct (accuracy determined). At 507, if the prediction is incorrect, the request is retried using the correct physical address bit value.

With regard to exemplary embodiments thereof, methods and systems for managing synonyms in VIPT caches are disclosed. A method includes tracking lines of a copied cache using a directory, examining a specified bit of a virtual address that is associated with a load request and determining its status and making an entry in one of a plurality of parts of the directory based on the status of the specified bit of the virtual address that is examined. The method further includes updating one of, and invalidating the other of, a cache line that is associated with the virtual address that is stored in a first index of the copied cache, and a cache line that is associated with a synonym of the virtual address that is stored at a second index of the copied cache, upon receiving a request to update a physical address associated with the virtual address.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

I claim:

1. A non-transitory computer readable medium having stored therein a set of instructions, which when executed by a computing device cause the computing device to perform a set of operations, the operations comprising:
    tracking lines of level 1 cache that are copied to a level 2 cache using a directory in a cache controller of the level 2 cache;
    examining a specified bit of a virtual address that is associated with a load request at the cache controller and determining its status;
    making an entry in one of a plurality of parts of said directory based on the status of the specified bit of the virtual address that is examined; and
    changing, in a single clock cycle, only a data value, of one of, and invalidating the other of in the single clock cycle, a cache line that is associated with said virtual address that is stored in a first index of the level 2 cache, and a cache line that is associated with a synonym of said virtual address that is stored at a second index of the level 2 cache, upon receiving a request to update a physical address associated with said virtual address, where the synonym is another virtual address that maps to the physical address of a memory component.

2. The non-transitory computer readable medium of claim 1 wherein said virtual address and said synonym is identified in said directory before said invalidating.

3. The non-transitory computer readable medium of claim 1 wherein making said entry in said directory comprises placing said entry in one of a first and a second panel based on said specified bit of said virtual address.

4. The non-transitory computer readable medium of claim 1 wherein said cache line associated with said virtual address stored in said first index of the level 2 cache, and said cache line associated with said synonym stored at said second index of the level 2 cache reside at said first and said second index until a request to update said physical address associated with said virtual address is made.

5. The non-transitory computer readable medium of claim 1 wherein said invalidating of said one of said first cache line that is associated with said virtual address that is stored in a first index of the level 2 cache, and said second cache line that is associated with said synonym, is determined randomly.

6. The non-transitory computer readable medium of claim 1 further comprising receiving said load request from a level 2 cache pipeline.

7. The non-transitory computer readable medium of claim 1 wherein said directory comprises a first and a second panel that correspond to first and second virtual address ranges.

8. The non-transitory computer readable medium of claim 1 wherein the level 2 cache is a copy of a level 1 cache.

9. The non-transitory computer readable medium of claim 1 wherein said cache system is a virtually indexed physically tagged (VIPT) system.

10. A cache memory system, comprising:
   memory components including a main memory, a level 1 cache and a level 2 cache; and
   a memory controller in the level 2 cache, wherein said memory controller includes a system for managing synonyms that comprises:
      a tracking component that tracks copied lines of the level 1 cache in the level 2 cache using a directory;
      an examining component that examines a specified bit of a virtual address that is associated with a load request and determining its status;
      an entry making component that makes an entry in one of a plurality of parts of said directory based on the status of the specified bit of the virtual address that is examined; and
      a cache line updating and invalidating component that changes only a data value, in a single clock cycle, of one of, and invalidates the other of in the single clock cycle, a cache line in the level 2 cache that is associated with said virtual address that is stored in a first index of the level 2 cache, and a cache line that is associated with a synonym of said virtual address that is stored at a second index of the level 2 cache, upon receiving a request to update a physical address associated with said virtual address, where the synonym is another virtual address that maps to the physical address in the main memory.

11. The cache memory system of claim 10 wherein said cache line updating and invalidating component identifies said virtual address and said synonym in said directory before said changing and said invalidating.

12. The cache memory system of claim 10 wherein said entry making component places said entry in one of a first and a second panel based on said specified bit of said virtual address.

13. The cache memory system of claim 10 wherein said cache line updating and invalidating component allows said cache line associated with said virtual address stored in said first index of the level 2 cache, and said cache line associated with said synonym stored at said second index of the level 2 cache to reside at said first and said second index until a request to update said physical address associated with said virtual address is made.

14. The cache memory system of claim 10 wherein said cache line updating and invalidating component determines randomly said changing and said invalidating of said one of said cache line that is associated with said virtual address that is stored in a first index of the level 2 cache, and said cache line that is associated with said synonym.

15. The cache memory system of claim 10 wherein said examining component examines load requests from a level 2 cache pipeline.

16. The cache memory system of claim 10 wherein level 2 cache is a copy of the level 1 cache.

17. The cache memory system of claim 10 wherein said cache system is a virtually indexed physically tagged (VIPT) system.

* * * * *